Dec. 11, 1951     E. A. BULLOCK     2,578,336
SIGN PROJECTION APPARATUS
Filed July 17, 1948     2 SHEETS—SHEET 1
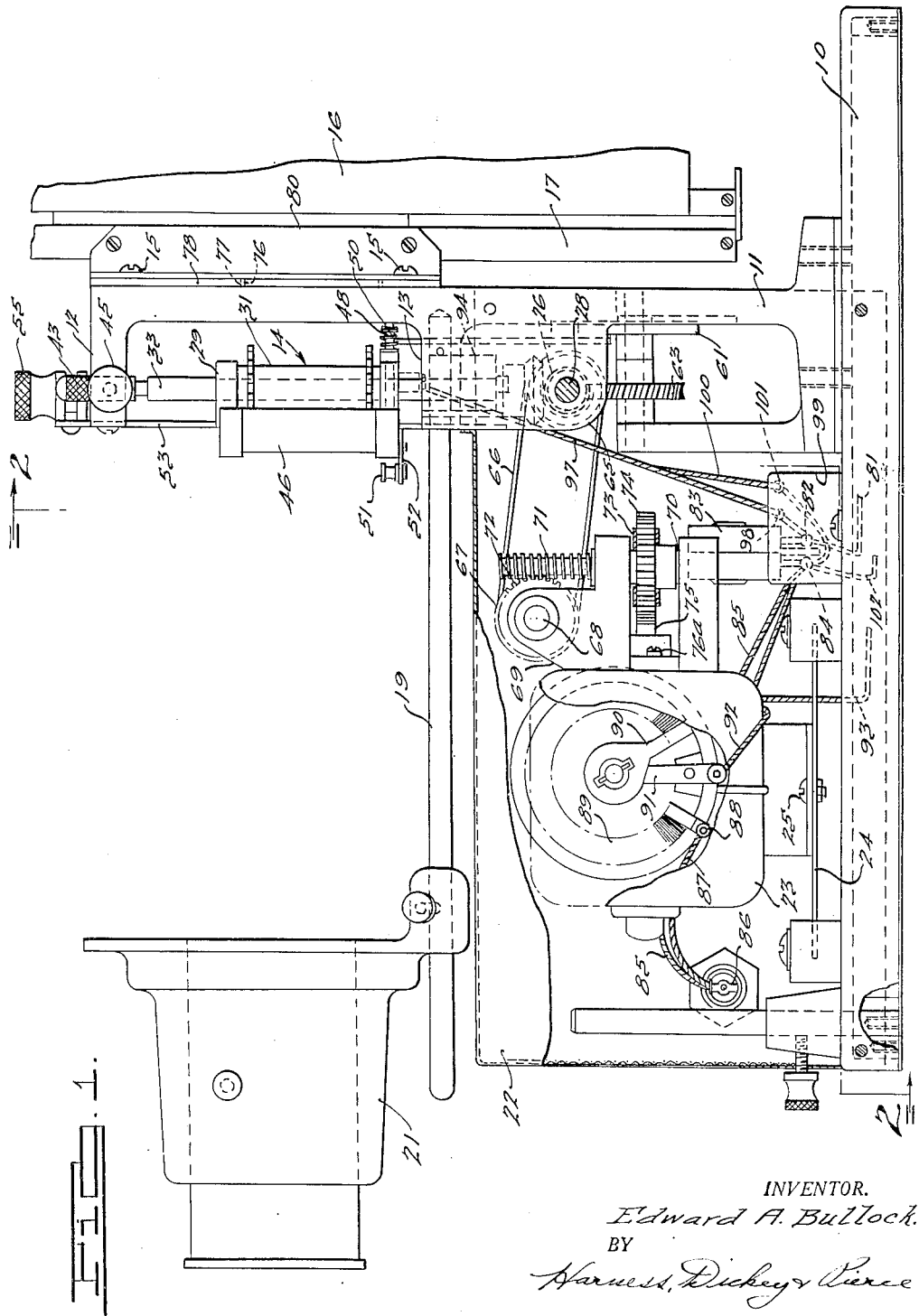
INVENTOR.
Edward A. Bullock.
BY
Harness, Dickey & Pierce
ATTORNEYS.

Dec. 11, 1951     E. A. BULLOCK     2,578,336
SIGN PROJECTION APPARATUS
Filed July 17, 1948     2 SHEETS—SHEET 2
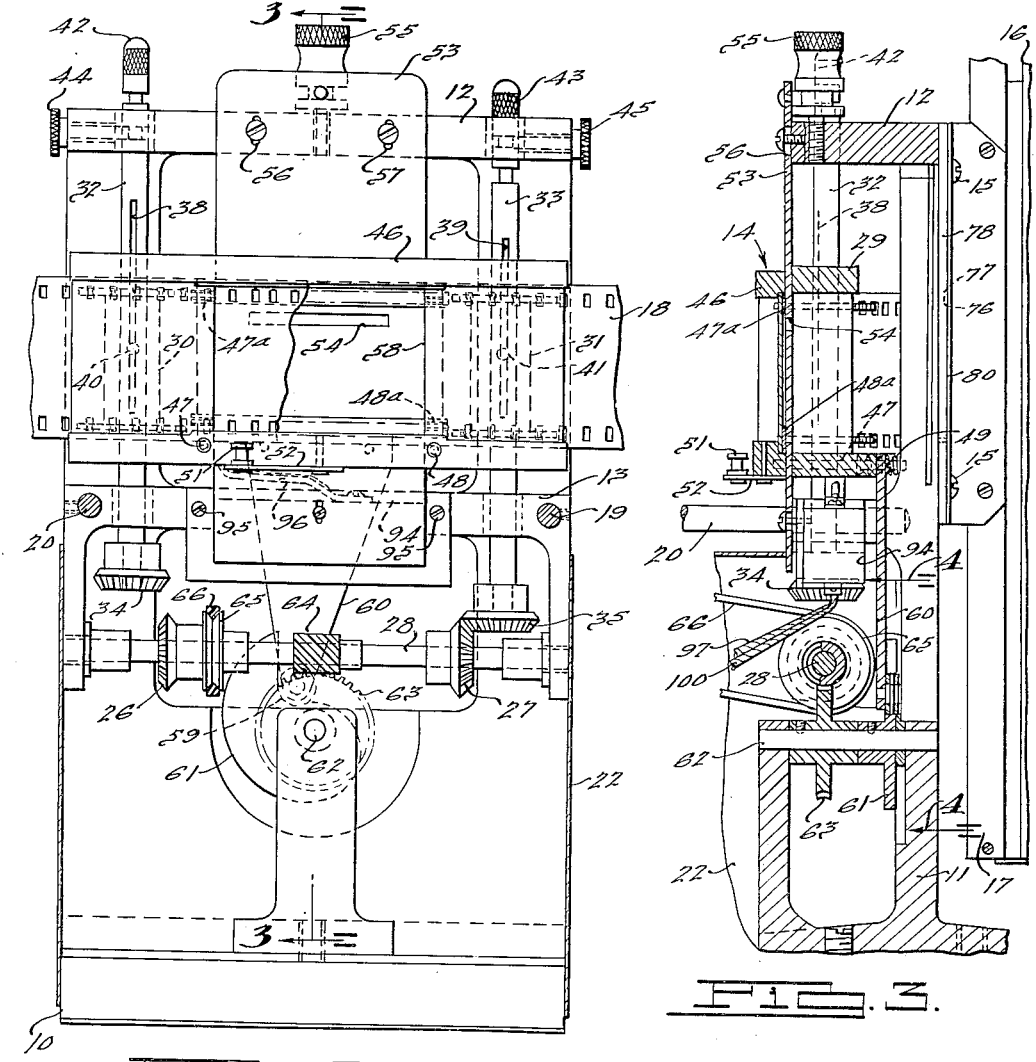
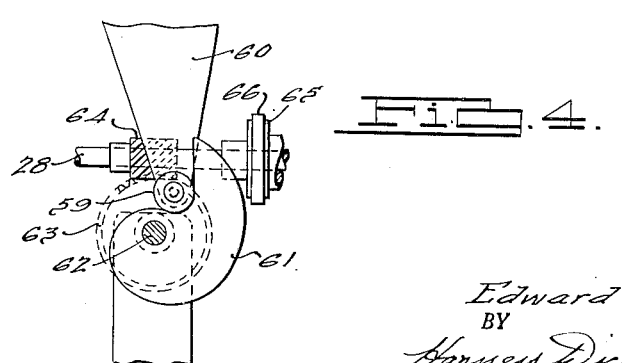
INVENTOR.
Edward A. Bullock.
BY
Harness, Dickey & Pierce.
ATTORNEYS.

Patented Dec. 11, 1951

2,578,336

UNITED STATES PATENT OFFICE 2,578,336

SIGN PROJECTION APPARATUS

Edward A. Bullock, Detroit, Mich., assignor, by mesne assignments, to National Advertising Company, Westminster, Md., a corporation of Delaware Application July 17, 1948, Serial No. 39,280

7 Claims. (Cl. 88—24)

This invention relates generally to sign projecting apparatus in which desired character images are made to appear upon and move across the sight portion of a sign, located at a point remote from the projector, in proper sequence and at uniform speed, and more particulary constitutes an improvement over the sign projector of the now expired United States Patent No. 1,549,374, issued August 11, 1925, to T. A. Nolan.

The improved sign projector of the present invention embodies a novel driving connection between the driving motor and the film moving mechanism, instead of the direct gear drive heretofore utilized to this end, and in addition, includes a normally closed switch in the circuit arranged in a novel manner with the main switch whereby, upon opening of the main switch, the projector may be left unattended and yet it will continue to operate to the end of the film, at which time it will close off automatically. Moreover, novel means in the form of a heat filter element mounted in and carried by a section of a heat insulator is interposed between the heat cover of the lamp housing which supports the condenser lens of the projector, and the film to prevent an undue amount of heat from being transmitted from the lamp to the film.

An object of the present invention, therefore, is to provide a new and novel sign projecting apparatus.

Another object of the invention is to provide a new and improved sign projector having heat-dissipating means interposed in a novel manner between the condenser lens and the film.

A further object is to provide a novel sign projector in which the main switch may be open and the projector although unattended will continue to operate for a definite time cycle and will automatically discontinue such operation at the expiration of the cycle.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views:

Figure 1 is a side elevation view of the novel sign projector of the present invention having part of the protective casing for the motor broken away;

Fig. 2 is a sectional view taken substantially along line 2—2 of Fig. 1;

Fig. 3 is a sectional view taken substantially along line 3—3 of Fig. 2; and

Fig. 4 is a sectional view taken substantially along line 4—4 of Fig. 3, illustrating the cam mechanism for moving the film carriage in elevation relative to the projector.

Referring now to the drawings for a more detailed description of the present invention, and more particularly to Fig. 1 thereof, the novel sign projector hereof generally includes a hollow base or supporting table 10 to which is fastened an upstanding bracket 11 having near its upper end, outwardly extending spaced arms 12 and 13 for supporting therein a film moving mechanism, generally designated with the reference character 14, in a manner to more fully appear hereafter. Suitably connected to the rear of the bracket, as by screws 15 for example, is a lamp housing 16 with a hollow heat exchange chamber 17 interposed therebetween, the chamber and housing both being suitably apertured to receive a condenser lens system (not shown) for concentrating the light rays of the lamp upon a film 18 to be projected. The front of bracket 11 receives therein guide rods 19 and 20 which slidably support thereon a lens mount or tube 21 for axial motion relative to the lamp by virtue of which proper focusing of the projector is acquired. Mounted between the guide rods and table 10 is a protective casing 22 having a motor 23 which may operate on either A. C. or D. C. or both. The motor is fastened to a base 24 spaced from table 10 by way of suitable fastener means 25 and is adapted to drive two spaced bevel gears 26 and 27 (Fig. 2) which are secured to a transverse shaft 28 suitably journaled in side extensions of bracket 11 through a novel drive connection to be more fully described hereinafter.

Film 18 is in the form of an endless tape and bears intelligence thereon of a character which it is desired to project onto a screen or sign and which is so arranged on the tape as to form thereon one continuous line spirally in convolutions as more fully described in the aforementioned United States Patent No. 1,549,374.

The film moving mechanism 14 generally includes a frame 29 which at its outer end supports sprocket spools 30 and 31, the latter being provided with lugs for engaging with the film perforations to thereby move the film transversely of the projector. The outer ends of frame 29 are apertured to receive slidably therein and within spools 30 and 31, two rods 32 and 33 which at their lowermost ends carry bevel gears 34 and 35 for selective engagement with bevel gears 26 and 27. The rods are further provided with axial slots 38 and 39 (Fig. 2) which permit axial motion of the rods relative to the spools, the latter, however, being provided with pins 40 and 41 engaging, respectively, the slots 38 and 39, whereby rotary motion by one or the other of the rods, depending upon which is in drivable engagement with gears 26 and 27, imparts rotary motion to its related spool. The uppermost ends of the rods are provided with knurled heads 42 and 43 so that depending upon the type of screen to be used, i. e., transparent or opaque wherein the screen is to be viewed from the front or back, one or the other of the rods may be engaged with its related driving gear and the film properly arranged on film moving mechanism 14, whereupon the film will run in one direction or another as required. Means are also provided in the form of set screws 44 and 45, together with cooperating grooves formed on the rods, whereby when one of the gears 34 or 35 is engaged with its related bevel gear 26 or 27, the other may be maintained out of engagement with its bevel gear (Fig. 2).

Attached to frame 29 for movement therewith in elevation, is an auxiliary frame or gate 46 (Fig. 1) which is attached to the frame by means of rods 47 and 48. The inner ends of the rods are engaged by springs 49 and 50 which normally urge the gate inwardly to define a guide surface for maintaining the film on the sprocket wheels. The arrangement is such, however, that by angularly displacing a manual knob 51, a cam 52 engaging with a plate 53 will move the gate outwardly to permit replacement of the film.

The plate 53 is provided with a primary aperture 54 whose width is substantially the same as the width of any one line of characters on the film, and through which light rays from lamp housing 16 are impinged upon the film, the latter being arranged intermediate plate 53 at the inner surface of gate 46. Small resilient strips 47a and 48a may be attached to plate 53 to urge the film against gate 46 and thus direct its travel to and from spools 30 and 31. For adjusting the primary aperture 54 relative to the film, plate 53 may be moved upwardly or downwardly by virtue of a knob 55, slots 56 and 57 being provided for this purpose. A second and substantially larger aperture 58 is formed in gate 46 which cooperates with the primary aperture.

At the beginning of the message to be projected, film moving mechanism 14 is at its lowermost position on rods 32 and 33 and at this point a roller 59 which is rotatably supported at the end of an arm 60 fastened to the rear of frame 29, rests on the lowermost point of a cam 61. The cam, in turn, is fastened to a suitably journaled shaft 62 which also supports a gear 63 for driving engagement with a worm 64 carried by transverse shaft 28. By this arrangement, if film 18 is moved in one direction or another transversely of the projector, the film mechanism 14 is simultaneously moved at a predetermined rate in elevation relative to primary aperture 54, by the cam.

The foregoing arrangement has been described more or less generally as it is similar to that shown by the aforementioned United States Patent No. 1,549,374 to which reference is made for a more detailed description of the conventional portion of the projector.

Coming now to the novel features of the present invention, film mechanism 14 is operated by motor 23 through a novel belt drive and gear arrangement, to move film 18 transversely of the projector. For this purpose transverse shaft 28 has fastened thereto, a pulley 65 which is driven by an endless belt 66 (Figure 1), the latter engaging with a second pulley 67, carried by a shaft 68, journaled transversely of the motor within a bracket 69. The bracket further journals a shaft 70 therein which is arranged at right angles to shaft 68 and which, at its upper end, carries a worm gear 71 for driving engagement with a gear 72 fastened to transverse shaft 68, and its lower end carries a gear 73 in driving engagement with a worm 74 carried by a motor shaft 75. Inasmuch as bracket 69 is fastened to the end housing of motor 23 by suitable means such as screws 76a, for example, the belt 66 may be slipped off pulley 67 and the entire motor, together with its gear train, may be readily removed from the supporting base or table 10 for servicing requirements.

With the foregoing arrangement, depending upon whether gear 34 is in driving engagement with bevel gear 26 or whether gear 35 is in engagement with bevel gear 27, the film 18 will be moved transversely of the projector by way of motor 23, the driving connection therebetween being defined through worm 74, gear 73, worm 71, gear 72, pulley 67, belt 66, pulley 65 and shaft 28, which carries bevel gears 26 and 27 thereon.

Novel means are also provided to minimize the amount of heat which would otherwise be transmitted from lamp housing 16 to the film. To this end, a glass or plastic infra-red ray filter 76 is provided between the lamp housing and the film. The filter is mounted within an aperture 77 formed in a heat insulator element 78, the latter being inserted between the rear of bracket 11 and heat dissipating chamber 17 and fastened to the bracket by way of screws 15 which maintain chamber 17 and lamp housing 16 in assembled relation with the bracket through a supporting bracket 80. By being spaced from bracket 11 in this manner, a considerable amount of heat generated within lamp housing 16 is dissipated within intermediate chamber 17 which is open to the atmosphere at both its upper and lower ends. Any heat that is passed through chamber 17 is prevented from passing to the film by virtue of the heat insulating element 78. Moreover, heat rays transmitted by the lamp are filtered out by filter 76 so that danger from overheating of the film is eliminated.

Current for energizing motor 23 is conducted thereto by means of a suitable conductor 81 (Fig. 1), connected to one side of a suitable source of current (not shown) and which connects with a terminal 82 of a main switch 83. The second terminal 84 of the switch is connected by way of a conductor 85, a fuse 86 and a conductor 87 with one terminal 88 of a rheostat or potentiometer 89. The latter is provided with a wiping contact arm 90 which is settable from the exterior of the casing by way of a suitable knob (not shown) whereby the speed of the motor may be predetermined. In electrical engagement with contact 90 is a second terminal 91 which connects with one side of the motor through a conductor 92, the remaining side thereof being connected directly with the source by way of a conductor 93. The motor will thus be energized when switch 83 is closed and the speed of the motor will be regulated by adjustment of wiper arm 90 relative to the potentiometer.

In order that the projector may be left unattended and yet operate for a predetermined interval of time in spite of the fact that the main switch 83 is open, a second switch 94 (Fig. 2) is provided in a novel manner to permit such operation for a given length of time and will thereafter act to open the circuit and thus de-energize the motor. To this end, therefore, switch 94 is secured to bracket 11 by suitable means such as screws 95 and is arranged below film mechanism 14. The switch is of the type in which the two contacts thereof are normally in engagement, one of them, however, being secured to a resilient arm 96 (Fig. 2) which when engaged and pressed downwardly will disengage and open the contacts. For a purpose to presently appear, arm 96 is arranged so that if roller 59 passes from the high point of cam 61 to the lowermost point thereof, the frame 29, on dropping downwardly, representing a complete projection of the message on film 18, engages the arm and opens the circuit which will de-energize the motor, assuming main switch 83 to be open.

One side of switch 94 is connected by way of a conductor 97 (Fig. 1) through one side or terminal 98 of a quenching condenser 99, with terminal 82 of the main switch 83, while the other side of switch 94 is connected with terminal 84 of the main switch through a conductor 100 and the other side or terminal 101 of the condenser. One side of the lamp within housing 16 is connected with conductor 81 while the opposite side thereof is connected with terminal 84 of the main switch through a conductor 102.

With the foregoing novel arrangement of the circuit elements, closing of main switch 83 will result in operation of both motor 23 and energization of the lamp within housing 16. The motor will not only move film 18 transversely of the projector through the driving connection hereafter described but will also angularly displace cam 61 through worm 64 and gear 63. At the beginning of the projection cycle, the begining of the first line of characters on film 18 is positioned immediately in fron of primary aperture 54 of plate 53 and roller 59 is at the lowermost point of cam 61 as shown in Fig. 4. As motor 23 continues to operate, cam 61 is displaced angularly at a predetermined rate to slowly move roller 59 on its surface to thereby move frame 29 upwardly relative to aperture 54 through arm 60. As the frame moves away from switch arm 96, the latter assumes a normal position in which the switch contacts are engaged. If it is desired to leave the projector unattended at this point, main switch 83 is open but motor 23 continues to operate because switch 94, which is connected in parallel to switch 83, is closed. The projector will continue to operate until the message on the film has been entirely projected at which time the roller 59 will have arrived at the high point of cam 61. Immediately thereafter, with continuing operation of the motor, roller 59 passes to the lowermost point of the cam, moving frame 29 downwardly until it engages with and depresses switch arm 96. The contacts of switch 94 are thus disengaged to open the circuit whereupon both the motor and the lamp within housing 16 are de-energized.

It will now be apparent to those skilled in the art that a novel and improved sign projector has been provided in which the transmission of heat to the film from the lamp housing has been minimized and wherein not only has a novel driving connection been provided between the motor and film mechanism but also a novel circuit arrangement has been provided whereby the projector may be left unattended and yet operate for a full cycle and thereafter shut itself off automatically.

Although but a single embodiment of the present invention has been illustrated and described in detail, it is to be expressly understood that the invention is not limited thereto. Various changes may be made in the form and relative arrangement of the parts without departing from the spirit and scope of the invention.

What is claimed is:

1. In a sign projector having a supporting bracket together with a film moving mechanism on said bracket for moving said film transversely of said projector, a motor for operating said mechanism, a driving connection between said motor and said mechanism comprising a pulley and a gear train carried by said motor, a second pulley rotatably mounted in said bracket, an endless belt engaging both pulleys whereby in response to operation of said motor said gear train operates said first pulley to drive said second pulley through said belt, and means responsive to motion of said second pulley for operating said mechanism to move said film transversely of said projector.

2. In a sign projector having a supporting base and an upstanding bracket thereon together with a film moving mechanism on said bracket for moving said film transversely of said projector, a motor fastened to said base for operating said mechanism, a bracket supported by said motor, a gear train carried by said motor bracket and operated by said motor, a shaft journaled in said motor bracket and arranged transversely of said motor, a pulley carried by said shaft and driven by said gear train, a second shaft journaled in said first-named bracket and arranged in parallel relation to said first shaft, a second pulley carried by said second shaft, and endless belt engaging both of said pulleys whereby in response to operation of said motor said gear train operates said first pulley to drive said second pulley through said belt, and means responsive to motion of said second pulley for operating said mechanisms to move said film transversely of said projector.

3. In a sign projector having a supporting bracket together with a film moving mechanism mounted on said bracket for up and down motion relative to said bracket and adapted for moving said film transversely of said projector, means for moving said film mechanism from an initial low point on the bracket at the beginning of the message to be projected to a maximum high point at which latter point the message is completed, means including a motor for operating said last-named means and for simultaneously operating said mechanism to move said film transversely of said projector, a main switch for energizing said motor, and a second switch connected in parallel with said main switch for assuming primary control of said motor when said film mechanism has been moved from its initial position by said motor.

4. In a sign projector having a supporting bracket together with a film moving mechanism mounted on said bracket for up and down motion relative to said bracket and adapted for moving said film transversely of said projector, means for moving said film mechanism from an initial low point on the bracket at the beginning of the message to be projected to a maximum high point at which latter point the message is completed and for thereafter returning said mechanism to said initial low point, means including a motor for operating said last-named means and for simultaneously operating said mechanism to move said film transversely of said projector, a main switch for energizing said motor, a normally closed second switch connected in parallel with said main switch for maintaining operation of said motor when said main switch has been opened to permit unattended operation of said projector, means for mounting said second switch on said bracket underneath said mechanism, and means on said second switch engageable by said mechanism when the latter returns to its initial starting position subsequent to completion of said message to operate said second switch and thereby de-energize said motor.

5. A sign projector having a supporting base and an upstanding bracket thereon, a focusing lens mounted on said bracket and adapted for slidable motion axially thereof, a lamp housing for emitting light rays therefrom, a film moving mechanism supported on said bracket and interposed between said housing and said lens whereby a message on said film is transmitted through said lens to a remote point, a heat exchange chamber inserted between said lamp housing and said bracket for dissipating the heat generated by said housing, a filter element between said heat exchange chamber and said bracket for eliminating infrared rays from passing from said lamp chamber to said film, a heat insulator element supporting said filter element thereon, and means for fastening said heat insulator element, said heat exchange chamber and said lamp housing to said bracket.

6. In a sign projector having a supporting bracket together with a film moving mechanism on said bracket for moving said film transversely of said projector, a pair of spaced sprocket wheels over which the film is driven, a gate spanning said sprocket wheels having projecting ends which extend around said sprocket wheels for encasing said film and retaining said film on said sprocket wheels, and means for driving said sprocket wheels, said driving means moving said gate vertically, said gate having projecting flanges at the top and bottom for extending over and protecting the edges of the film.

7. In a sign protector having a supporting bracket together with a film moving mechanism on said bracket for moving said film transversely of said projector, a pair of spaced sprocket wheels over which the film is driven, a gate spanning said sprocket wheels having projecting ends which extend around said sprocket wheels for encasing said film and retaining said film on said sprocket wheels, means for driving said sprocket wheels, said driving means moving said gate vertically, said gate having projecting flanges at the top and bottom for extending over and protecting the edges of the film, and means for moving said gate toward and away from said sprocket wheels.

EDWARD A. BULLOCK.

REFERENCES CITED

The following references are of record in the file of this patent:

UNITED STATES PATENTS

| Number | Name | Date |
|---|---|---|
| 785,237 | Smith | Mar. 21, 1905 |
| 1,298,393 | Proctor | Mar. 25, 1919 |
| 1,434,268 | Tillyer | Oct. 31, 1922 |
| 1,549,374 | Nolan | Aug. 11, 1925 |
| 1,756,980 | Joy | May 6, 1930 |
| 1,885,841 | Krupnik | Nov. 1, 1932 |
| 1,945,909 | Moreno | Feb. 6, 1934 |
| 2,008,982 | Hopkins | July 23, 1935 |
| 2,235,701 | Elliott et al. | Mar. 18, 1941 |
| 2,279,084 | Tillyer | Apr. 7, 1942 |
| 2,346,074 | Hopkins | Apr. 4, 1944 |